United States Patent [19]

Romer et al.

[11] Patent Number: 5,404,981
[45] Date of Patent: Apr. 11, 1995

[54] HYDRAULIC CLUTCH ACTUATION SYSTEM AND METHOD OF INSTALLING

[75] Inventors: Graham P. Romer; Montegue J. Ward, both of Leamington Spa; David A. Harries, Welford on Avon, all of United Kingdom

[73] Assignee: Automotive Products, plc, Leamington Spa, England

[21] Appl. No.: 185,911

[22] PCT Filed: May 5, 1993

[86] PCT No.: PCT/GB93/00926
§ 371 Date: Feb. 1, 1994
§ 102(e) Date: Feb. 1, 1994

[87] PCT Pub. No.: WO93/25824
PCT Pub. Date: Dec. 23, 1993

[30] Foreign Application Priority Data

Jun. 5, 1992 [GB] United Kingdom ............... 9211921

[51] Int. Cl.⁶ .................... F16D 25/12; F16D 23/12; F16C 1/22
[52] U.S. Cl. ................ 192/85 C; 192/91 R; 192/111 R; 74/501.5 R; 74/502.6; 29/452
[58] Field of Search ........... 192/111 R, 91 R, 91 A, 192/85 C; 74/502.6, 501.5 R; 60/570, 568; 29/452

[56] References Cited

U.S. PATENT DOCUMENTS

| | | | |
|---|---|---|---|
| 4,687,084 | 8/1987 | Leigh-Monstevens et al. ....... | 192/91 A X |
| 4,889,006 | 12/1989 | Kolinske et al. ................ | 74/502.6 X |
| 5,207,116 | 5/1993 | Sultze .......................... | 74/502.6 X |

FOREIGN PATENT DOCUMENTS

| | | |
|---|---|---|
| 0097594 | 1/1984 | European Pat. Off. . |
| 0130820 | 1/1985 | European Pat. Off. . |
| 0371654 | 6/1990 | European Pat. Off. . |
| 2611832 | 9/1988 | France . |
| 3801460 | 8/1989 | Germany . |
| 2138899 | 10/1984 | United Kingdom . |
| WO91/10836 | 7/1991 | WIPO . |

Primary Examiner—Rodney H. Bonck
Attorney, Agent, or Firm—Paul E. Milliken; Lee A. Germain

[57] ABSTRACT

A vehicle clutch actuation system and a manually adjustable cable (12) therefor, the cable having an elongated end fitting (13) for transferring operating loads to a lever (22). The end fitting (13) comprises an inner and outer part (14 and 15) respectively and the inner part has a plurality of longitudinally spaced grooves (16) thereon and a resilient clip (25) which is selectively locatable in any one of said grooves. The inner part (14) is telescopically mounted in the outer part (15), with the clip (25) abutable against the outer part (15), which has an abutment seat (19) thereon for seating against the lever (22).

5 Claims, 2 Drawing Sheets

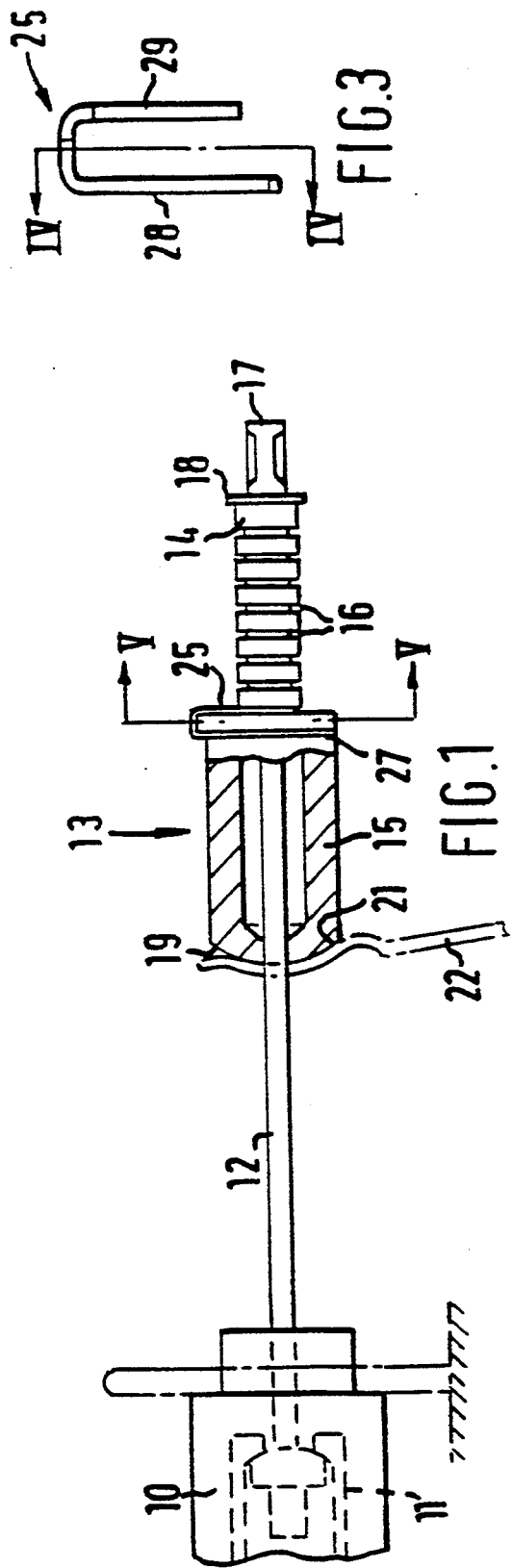
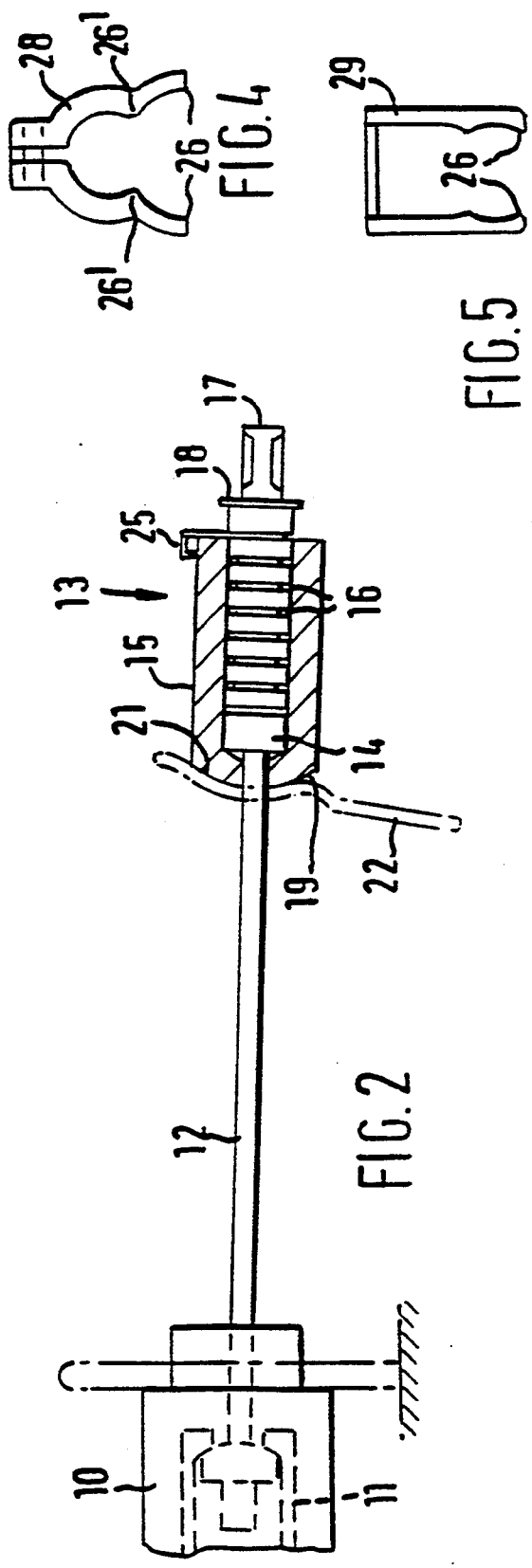
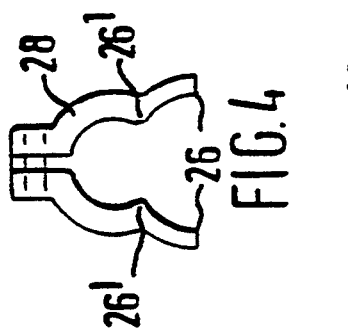
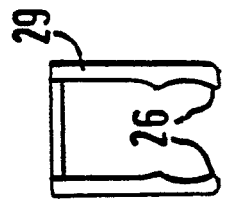

HYDRAULIC CLUTCH ACTUATION SYSTEM AND METHOD OF INSTALLING

This invention relates to cables and in particular cables utilised in clutch actuation systems for motor vehicles.

Due to the increasing importance of space in a motor vehicle engine compartment it has become increasingly necessary to utilise hydraulic slave cylinders that can operate a vehicle clutch through a pull mechanism.

Such a pull type hydraulic slave cylinder is shown in the applicants published British patent application 2238362.

The use of a simple cable between the slave cylinder and clutch release lever requires the use of some type of adjuster mechanism to compensate for a build up of manufacturing tolerance in the clutch release system components.

Clutch control systems of the type described in WO089/08786 are sealed pre-filled actuation systems and it is important to ensure that the system slave cylinder has a piston at a preset position in the respective cylinder when the vehicle clutch is new.

The use of a cable adjuster allows presetting of the piston in the cylinder.

The present invention provides a simple means of manually adjusting the lengths of a cable.

According to the invention there is provided a manually adjustable cable having an elongated end fitting for transferring operating leads to a member and having a plurality of longitudinally spaced grooves therein, and a resilient clip which is selectively locatable in one of said grooves, wherein the end fitting comprises two parts, an inner part which is telescopically mounted in an outer part, the inner part having said grooves formed thereon for seating against said member and the clip is abutable against the outer part.

Conveniently the other end of the cable has an attachment means thereon for attachment to a cable pull device and a ferule is located on the cable a preset distance from the attachment means. Preferably the cable forms part of a motor vehicle clutch actuation system and the end fitting abuts a seat on a clutch release lever, and is preferably operated by a hydraulic slave cylinder.

There is also provided a method of initially setting up a clutch actuation system of the above type, wherein the slave cylinder piston is held in a fixed position in the slave cylinder by spacer means interposed between the ferrule and a reference surface on the slave cylinder, and the clutch release lever is moved in a release direction to take out the play in the release mechanism, and the end fitting is adjusted to place its abutment seat against the release lever.

Also according to the invention there is provided a motor vehicle prefilled hydraulic clutch actuation system which includes a hydraulic slave cylinder, the piston of which is attached to one end of a cable of the above type, wherein the piston is attached said other end of the cable away from the elongate end fitting and a spacing collar is inserted between the ferrule and the slave cylinder to accurately position the piston within the master cylinder body.

The invention will now be described by way of example and with reference to the following drawings which:

FIG. 1 shows a cable according to the invention in use forming part of a clutch actuation system, in an extreme condition of adjustment, FIG. 2 shows the cable of FIG. 1 in the other extreme condition of adjustment, FIG. 3 is a side view of a clip as used in FIG. 2

FIG. 4 is a view of the inner limb taken on the line IV—IV of FIG. 3.

FIG. 5 a sectional view of the clip as used in FIG. 1, taken on the line V—V of FIG. 1.

Figure 6:
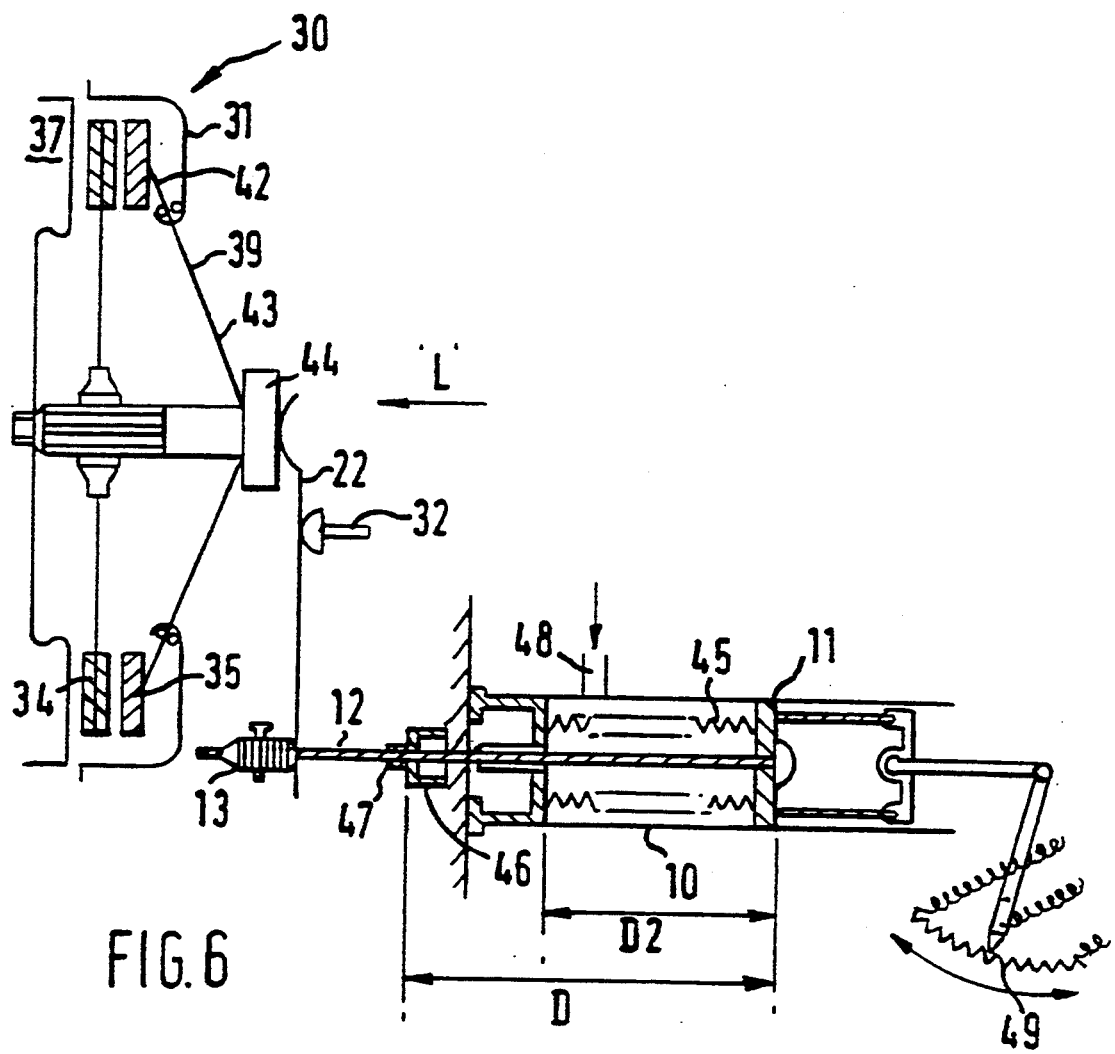
Figure 7:
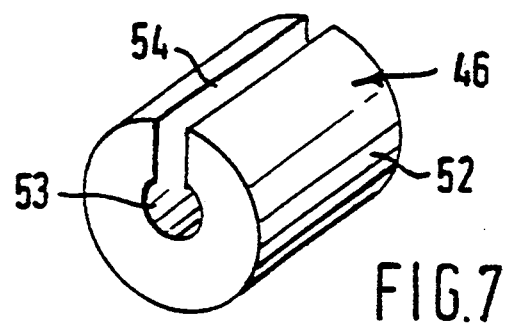

FIG. 6 is a schematic drawing of a clutch actuation system utilising a cable of the type shown in FIG. 1, and FIG. 7 is a schematic view of a space collar as is used to preset the slave cylinder piston position.

With reference to the drawings there is shown part of a motor vehicle clutch actuation system including a hydraulic slave cylinder which is of the type illustrated in British Patent 2238362 in which the piston 11 pulls the clutch operating cable 12 towards the slave cylinder 10.

The cable 12 is connected at one end to the slave cylinder piston (or some member attached thereto) and at its other end has an end fitting 13 fixed thereon.

The end fitting 13 comprises two parts, an elongated cylindrical inner part 14 and a hollow cylindrical outer part 15, in which the inner part 14 is telescopically slidable.

The inner part, 14 has a plurality longitudinally spaced circumferential grooves 16 in the outer surface thereof. There are, preferably, eight grooves 16 at 4 mm spaced intervals.

The inner part 14 may be fixed on the cable by any suitable means, e.g. crimping, brazing, soldering etc, or alternatively the inner part may be axially slidable on the cable and react against a washer 18 and an abutment 17, formed on the cable by crimping, during the operation of the cable.

The outer part 15 is hollow to allow the cable 12 to pass therethrough, and for accommodating the inner part. The end face 19 of the outer part 15, which in use is adjacent an abutment seat 21 on a motor vehicle clutch release lever 22, is convexly curved to co-operate with the abutment seat 21 which is concave. The outer part 15 has a single groove, or slot 27 in its outer periphery adjacent the other end away from the end face 19.

A spring clip 25 has two limbs 28 and 29. Each limb 28 and 29 is formed with a detent thereon. As shown in FIG. 5 the outer limb 29 comprises a pair of resilient legs with detents 26 thereon which locate in a groove 16 and is clipped over the inner part 14 where it is retained by the detents 26. Similarly the inner limb 28 see FIG. 4 has a double detent thereon 26, 26', the first detent 26 holds the clip 25 into the outer part 25 during transit, and then allows the inner part to slide freely. To set the inner part 14 in position the clip is then pushed home and the detent 26' locks onto the outer part and the detent 26 in the limb 29 locks onto the inner part 14. The clip 25 transfers the operating load, from the cable, from the inner part to the outer part of the end fitting and hence to the lever 22.

The plurality of spaced, grooves 14 allow the inner part 14 to be set in a large number of positions relative to the outer part 15 giving a total adjustable length of 28 mm in the case of eight grooves spaced 4 mm apart.

This adjustment is shown in the difference between the position of the inner port 14 relative to the outer part 15 as shown in FIGS. 1 and 2.

With reference now to FIG. 6 there is shown the cylindrical slave cylinder 10 which operates a vehicle friction clutch 30 through the lever 22 pivoted by a aspherical joint 32 to the gearbox housing.

The friction clutch 30 comprises a clutch plate 34 which is clamped between a pressure plate 35 and the vehicle engine flywheel 37 under the force exerted by a frustoconical diaphragm spring 39. The diaphragm spring 39 is pivoted to a clutch cover 31 fixed to the flywheel 37 and comprises a radially outer continuous portion 42 having radially inwardly circumferentially spaced spring finger 43 which engage a clutch release bearing 44 mounted on the lever 22.

The clutch driven plate 34 is released by pivoting the lever 22 anticlockwise about the joint 32 to move the bearing 44 leftwards as shown by arrow 'L' and flatten the diaphragm spring 39 which pivots relative to the cover 31. When the clutch plate 34 is re-engaged the spring 39 reverts to its conical shape moving the radially inner ends of the fingers 43 rightwards and causing the lever 11 to rotate clockwise on the pivot joint 32.

The slave cylinder may form part of a prefilled hydraulic clutch actuation system of the type described in WO89/08786, particularly such a system in which the slave cylinder length is restricted due to the space requirements in a vehicle engine compartment.

The slave cylinder is a pull cylinder in which fluid enters the inlet port 48 causing the piston 11 to move rightwards as shown to operate the clutch mechanism.

Due to space requirements dictating the length and hence volume of the slave cylinder, the prefilled slave cylinder may not have sufficient volume to absorb fluid displacements as the clutch wears, and the tolerances in the release actuation mechanism when first set. It is therefore important that the piston 11 is preset to a known position before the cable 12 is attached to the release lever 22, and tolerances are taken out of the system.

The slave cylinder piston 11 is biased by spring 45 to shorten the free lengths of the cable 12. The piston 11 is set in a known position simply by inserting a spacer collar 46 between a ferrule 47 attached to the cable 12 and a abutment surface associated with the slave cylinder body.

The ferrule 47 is fixed on the cable a preset known distance D from its end fitting attachment to the piston 11. When the spacer 46 is inserted between the ferrule 47 and the slave cylinder body the piston 11 is set a known distance along its piston stroke D2.

When the prefilled system including the slave cylinder is fitted to the vehicle the slave cylinder 10 is located in its position and the lever 22 is rotated anticlockwise to take out any lost motion movement due to tolerances, so that the release bearing 44, diaphragm spring 43 and lever 22 are all in contact.

The cable 12 is inserted through the lever 22 and the inner part 14 of the end fitting 13 set so that the cable is just taut when the outer face 15 abuts the lever 22. The clip 25 is then put in the appropriate groove 16. The collar 46 is then removed.

The operating length of the pull cable 12 and the piston position are now set relative to each other so that when the clutch is fully engaged the correct release lever travel, which is related to the lever piston movement, is set for the wear life of the clutch driven plate.

For a clutch actuation system as described in WO89/08786 the position of the clutch piston 11 is monitored by a lever operated potentiometer 49 connected to a electronic control system (not shown).

The collar 46 (See FIG. 7) is simply a plastic cup 52 having a central hole 53 to accommodate the cable 12, and a radial slot 54 to allow the cable to be inserted into the central hole.

We claim:

1. A motor vehicle hydraulic clutch actuation system comprising: a clutch release mechanism, a hydraulic slave cylinder having a piston operatively connected with one end of a cable, the other end of the cable being operatively connected with a clutch release lever via an adjustable fastening arrangement comprising an inner elongated part secured to said other end of the cable and having a plurality of longitudinal spaced grooves therein, an outer part operatively connected with the clutch release lever and telescopically surrounding the inner part, a ferrule fixed on the cable at a present distance from the attachment of the cable to the piston, a spacing collar insertable between the ferrule and the slave cylinder to accurately position the piston within the cylinder, and a resilient clip engageable with the outer part and selectively locatable in one of said grooves to vary the effective length of the cable to bring the outer part into contact with the clutch release lever when the clutch release lever has been moved to take out the play from the clutch release mechanism.

2. A clutch actuation system according to claim 1 wherein the clip has two limbs, one limb being engageable with the outer part and the other limb being engageable in one of the grooves in the inner part.

3. A clutch actuation system according to claim 1 wherein the outer part has a convex abutment surface for engagement with a correspondingly sloped formation on the clutch release lever.

4. A clutch actuation system according to claim 1 wherein the spacing collar comprises a plastics cup-shaped member with a central hole to accomodate the cable and a radial slot to allow the cable to be inserted into the central hole.

5. A method of installing a hydraulic slave cylinder in a vehicle clutch actuation system mounted on a vehicle, the system including a clutch release mechanism, a hydraulic slave cylinder having a piston operatively connected with one end of a cable, the other end of the cable being operatively connected with a clutch release lever via an adjustable fastening arrangement comprising an inner elongated part secured to said other end of the cable and having a plurality of longitudinal spaced grooves therein, an outer part operatively connected with the clutch release lever and telescopically surrounding the inner part, a ferrule fixed on the cable at a present distance from the attachment of the cable to the piston, and a resilient clip engageable with the outer part and selectively locatable in one of said grooves to vary the effective length of the cable to bring the outer part into contact with the clutch release lever when the clutch release lever has been moved to take out the play from the clutch release mechanism, comprising the steps of: inserting a spacing collar between the ferrule and the slave cylinder to accurately position the piston within the cylinder, securing the slave cylinder on the vehicle, moving the clutch release lever to take out the play in the clutch release mechanism, locating the resilient clip in the appropriate groove in the inner part so that the outer part abuts the clutch release lever, and removing the spacing collar to ready the system for operation.

* * * * *